Patented Aug. 22, 1939

2,170,387

UNITED STATES PATENT OFFICE 2,170,387

GLAZE

John D. Morgan, South Orange, N. J., assignor to Power Patents Company, Hillside, N. J., a corporation of Maine No Drawing. Application May 25, 1937, Serial No. 144,603

2 Claims. (Cl. 106—36.2)

The present invention relates to a high temperature resistant refractory glaze and process of making the same.

It is an object of the present invention to provide a high temperature resistant glaze that possesses good dielectric properties and is thoroughly bonded.

Another object of the invention is to provide a high temperature resistant glaze which can be applied as a surface glaze that will not blister, crack or roughen when subjected to relatively high temperatures.

Another object of the invention is to provide a fine textured glaze adapted for use as a filler to cover any imperfection or roughness that may lie on the surface of a refractory to which the cement may be applied.

Another object of the invention is to provide a glaze that will greatly reduce the porosity of the refractory to which it is applied so as to make the surface of the refractory practically waterproof.

With the above and other objects and features in view the invention is hereinafter described and more particularly defined in the claims.

The preferred method of making the cement which forms the subject of the present invention is as follows:

Native zircon (zirconium silicate) is milled so that most or at least 75% of the milled material will pass through a 300 mesh screen. To about 66 parts by weight of the milled zircon is added about 33 parts by weight of phosphoric acid $H_3PO_4$ (85%). The mixture of phosphoric acid and zircon is thoroughly mixed and digested at a temperature in the neighborhood of boiling water. The mixture is digested for a period of time until the consistency of the mixture has increased to that of a thick paste. In the last stages of digestion it is preferred to apply a strong vacuum (about 20″ or more of mercury) in order to pull out any entrapped air bubbles in the mixture.

While the process of making the cement described above involves the use of ⅓ by weight of the acid, it has been found that a satisfactory cement embracing the features of the present invention can be made by varying the amount of the acid used in the range of 10 to 50% by weight of zircon used in the composition of the mixture.

It is often desired to color the cement without reducing the dielectric properties possessed by the uncolored cement. To accomplish this, small amounts of metallic oxides or metallic silicates are added to the digested mixture. If needed a small amount of water is added to bring the mixture to a consistency where the coloring materials can readily be dispersed throughout the mixture.

Small amounts of manganese and iron oxide, or cobalt and iron oxide when added to the mixture gave a black color to the cement. Various other colors may of course be effected by varying the amounts of the oxides listed above, or by combining various of these color imparting oxides together, or with some other oxides.

In addition to the oxides above mentioned, a metallic silicon, preferably ferrosilicon that is ground finely enough to pass through a 300 mesh screen, will impart a black color when added to the cement. A small amount of ferrosilicon, i. e. from 1 to 5% by weight of the mixture, added to the cement has been found to impart a suitable black color to the cement.

The high temperature resistant cement described above has been found to be particularly suitable as a cement and glaze when applied as a surface coating to the zircon-ferrosilicon refractory described in my co-pending application S. N. 87,662, filed June 27, 1936. The refractory therein disclosed comprises a mixture of about 40 parts by weight of ground ferrosilicon, the mixture being bonded by the reaction products of about 6 parts by weight of phosphoric acid therewith at a temperature in the neighborhood of from 175° to 200° F.

The high temperature resistant cement herein disclosed may be applied to a ceramic body as a layer of paste to any desired thickness in any of the well-known methods that cements and glazes are applied.

Having thus described the invention, what is claimed as new is:

1. A high temperature resistant glaze formed by thoroughly mixing and reacting a mixture of about 90 to 50 parts by weight of finely ground zircon and about 10 to 50 parts by weight of phosphoric acid and a small proportion of finely ground ferrosilicon.

2. A high temperature resistant glaze as defined by claim 1 in which the amount of ferrosilicon added is from 1 to 5% by weight of the mixture.

JOHN D. MORGAN.